United States Patent [19]
Chazelle

[11] Patent Number: 5,899,130
[45] Date of Patent: May 4, 1999

[54] APPARATUS FOR COMPACTING AND CUTTING VOLUMINOUS OBJECTS OF STRONG ELASTICITY, NOTABLY OF PNEUMATICS

[76] Inventor: Hubert Chazelle, 8 ter, rue Jean Jaures, 10120 Saint Andre Les Vergers, France

[21] Appl. No.: 08/302,504

[22] Filed: Sep. 8, 1994

[30]   Foreign Application Priority Data

Sep. 8, 1993   [FR]   France .................................. 93 10834

[51] Int. Cl.⁶ ..................................................... B26D 7/06
[52] U.S. Cl. .............................. 83/176; 83/19; 83/436.6; 83/951; 241/DIG. 31
[58] Field of Search ................................ 83/19, 449, 444, 83/176, 951, 436.1, 436.15, 436.6, 436.3; 241/281, DIG. 31, 186.35, 276

[56]         References Cited

U.S. PATENT DOCUMENTS

| 3,170,642 | 2/1965 | Haidler ..................................... 241/281 |
| 3,911,772 | 10/1975 | Kisielewski ............................... 83/951 |
| 3,991,944 | 11/1976 | Baikoff ........................... 241/DIG. 31 |
| 4,174,104 | 11/1979 | Garvey . |
| 4,682,523 | 7/1987 | Johnson et al. .............................. 83/19 |
| 4,976,178 | 12/1990 | Barclay ..................................... 83/176 |

FOREIGN PATENT DOCUMENTS

| 532773A1 | 3/1993 | European Pat. Off. . |
| 2267834 | 11/1975 | France . |
| 496119 | 3/1930 | Germany ............................... 241/281 |
| 2308244 | 8/1974 | Germany . |
| 3704725 | 8/1988 | Germany . |
| 2158868 | 6/1993 | Germany . |
| 47515 | 2/1930 | Norway ................................. 241/281 |
| 237851 | 8/1925 | United Kingdom ................... 241/281 |

*Primary Examiner*—Kenneth E. Peterson
*Attorney, Agent, or Firm*—Weintraub & Brady

[57]              ABSTRACT

Apparatus for compacting and for cutting voluminous objects of strong elasticity, notably pneumatics.

The apparatus includes shears; positioned at the extremity of a tunnel of arranging and compacting, the tunnel has a rectangular cross section, narrowing toward the extremity and the four walls of the tunnel being constituted of parallel and juxtaposed rollers. The rollers are disposed transversely. The rollers of the vertical walls and of the horizontal superior wall being put into rotation by a motor apparatus.

11 Claims, 1 Drawing Sheet

APPARATUS FOR COMPACTING AND CUTTING VOLUMINOUS OBJECTS OF STRONG ELASTICITY, NOTABLY OF PNEUMATICS

FIELD OF THE INVENTION

The present invention has for its object an apparatus for compacting and cutting voluminous objects of strong elasticity, notably pneumatics.

DESCRIPTION OF THE PRIOR ART:

Worn tires and new defective tires must be cut up to permit the recovery of the raw material, and to do this one generally utilizes different existing apparati intended for a different usage, such as cutting presses of metal, used on tires compacted beforehand.

These apparati present disadvantages, notably at the time of passage from the compacting phase to the cutting-up phase, owing to the fact that the strong elasticity of the pneumatics which tends, after compacting, to regain their initial form, which renders the cutting-up difficult.

The present invention has for its goal to remedy these disadvantages by proposing an apparatus of compacting and cutting of voluminous objects of strong elasticity, notably pneumatics, of simple conception, which permits the cutting up of the pneumatics perfectly compacted, thus permitting an optimum cutting up.

SUMMARY OF THE INVENTION

The compacting and cutting apparatus of the present invention characterizes itself in that it comprises a means of cutting up of a known type, for example, guillotine shears, positioned at the extremity of an arranging and compacting tunnel, said tunnel, of rectangular section, narrowing toward the extremity, the four walls of the tunnel being constituted of parallel and juxtaposed rollers disposed transversely, the length of the rollers of at least two opposite walls progressively diminishing and become reconciled with said extremity, and said rollers, at least those of the two vertical walls and those of lower horizontal wall, being put into rotation by an appropriate motor apparatus.

According to the invention, the rollers, are motorized and/or in free rotation. The rollers are either notched or smooth, according to the type of objects to be compacted.

The arranging and compacting tunnel of the apparatus according to the invention allows the obtaining of a progressive compression of the objects, whatever their size, and the regular advancement of these up to the means for cutting.

The motorized rollers of the apparatus according to the invention can be advantageously turned in two directions, permitting, in the case of a blockage in the tunnel, to bring it back toward the back of the compacted objects.

A conveyor, vibrating or not, placed at the exit of the cutting post, completes the apparatus according to the invention.

The advantages and the characteristics of the present invention will become more clear from the description which follows and which relates to the drawings, which represent a non-limitative mode of realization of the present invention in which like reference numerals refer to like parts and where:

DETAILED DESCRIPTION OF THE PREFERRED EMBODIMENT

Figure 1:
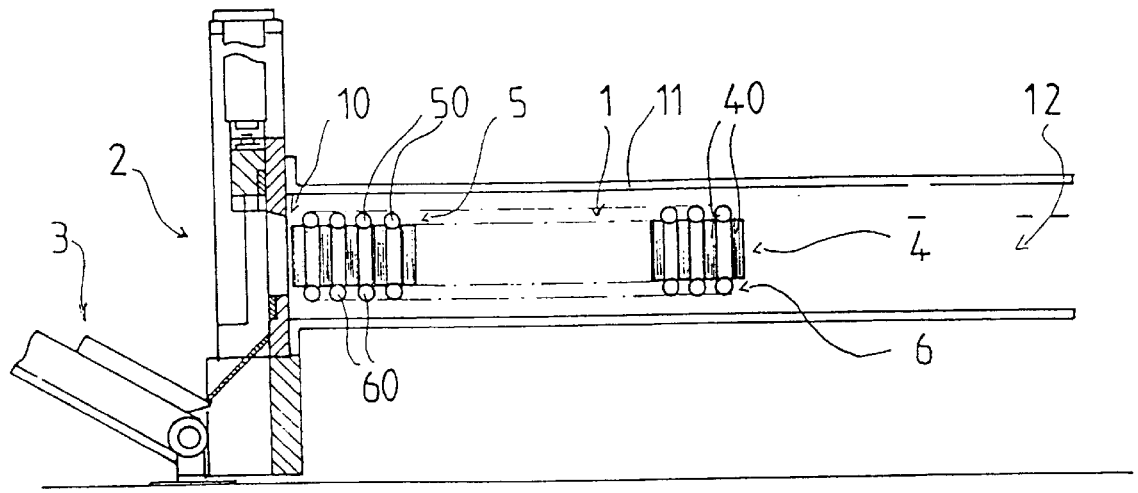
FIG. 1 represents a partial longitudinal section view, according to vertical plane, of a compacting and cutting apparatus according to the invention.
Figure 2:
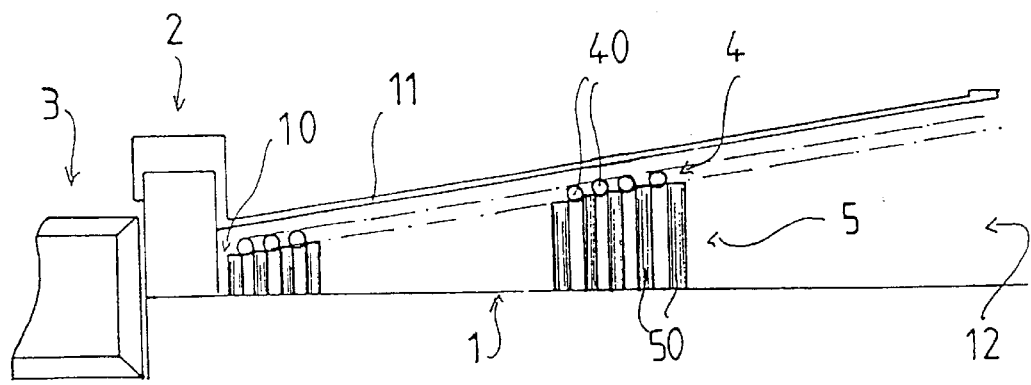
FIG. 2 represents a partial plane and section view of the same apparatus.

Referring to FIGS. 1 and 2, there is depicted therein; the compacting and cutting apparatus according to the present invention. The apparatus comprises a tunnel 1 of arranging and of compacting of a rectangular section, which narrows from one extremity to the other.

The extremity 10 the most narrow of the tunnel 1 emerges on guillotine shears 2, of type known per se, which will not therefore be described in further detail.

A conveyor 3, vibrating or not, is installed downside from the shears 2, permitting the evacuation of the scraps.

The two vertical walls of the tunnel 1 each include a row 4 of rollers 40, smooth, or notched, juxtaposed parallely, carried along in rotation by a motor apparatus (not shown).

The horizontal walls of the tunnel 1 each include rollers. The upper wall 13 includes a row 5 of rollers 50, smooth or notched, parallel and juxtaposed, mounted in free rotation. The lower wall 16 includes a row 6 of rollers 60, likewise smooth or notched, parallel and juxtaposed, carried along in rotation by a motor apparatus (not shown).

The rollers 40 of the vertical walls are interposed with the rollers 50 and 60 of the horizontal walls. The longitudinal axes of the rollers 40 and the longitudinal axes of the rollers 50 and 60 are situated in different normal planes, permitting a better "air tightness" of the tunnel 1 and facilitating the roller's interdependence to a support 11.

The vertical rollers 40 are of the same length as that of the horizontal rollers 50 and 60 having a length which diminishes toward the extremity 10 of the tunnel 1 which narrows toward said extremity 10.

This embodiment is preferred for its simplicity of conception. The rotation of the rollers 40, 50 and 60 being able to be realized at the extremity of the tunnel 1, by means of an apparatus driven by chains or gears such as a motor.

The preferred embodiment of the present invention is utilized in the following fashion: the objects of compacting and cutting are introduced in the tunnel 1 at its most wide extremity 12 and are carried along by the rotation of the vertical rollers 40 and horizontal rollers 60. Due to the narrowing of the tunnel 1 the objects are compacted and the resulting compacted mass is pushed out of the tunnel 1 by the extremity 10 where it is cut at the smaller shears 20.

It goes without saying that the present invention need not be limited to the detailed description which is illustrative of the application of the principles of the present invention and is capable of undergoing a certain number of modifications without leaving the realm of the invention. The narrowing of the tunnel can notably be realized not only in width but likewise in height.

What is claimed is:

1. An apparatus for compacting and cutting voluminous objects of strong elasticity, the apparatus comprising:
   (a) means for cutting having a linearly moving blade coacting with a stationary shearing blade;
   (b) a tunnel having a substantially horizontally aligned top wall, a substantially horizontally aligned bottom wall, the bottom wall parallel to the top wall, and two substantially vertically aligned side walls, each of the two side walls extending between the top wall and the bottom wall, the tunnel further including an entrance and an extremity, the tunnel being wider at the entrance than at the extremity, the extremity of the tunnel in communication with the means for cutting;

(c) a first set of cylindrical rollers disposed on and parallel to said top wall and said bottom wall, each of said first set of rollers extending substantially from one side wall to the other side wall, a second set of cylindrical rollers disposed on and parallel to said side walls, each of second set of rollers extending substantially from said top wall to said bottom wall, said first set of cylindrical rollers and said second set of cylindrical rollers being alternatingly interposed with one another as said objects advance thru said tunnel to said means for cutting, at least one of said sets of rollers being motorized, and (d) a conveyor in communication with and disposed adjacent the means for cutting; and wherein the plurality of rollers direct material fed into the entrance of the tunnel towards the extremity thereof and wherein the material is compressed within the tunnel, cut by the means for cutting and then conveyed via the conveyor.

2. The apparatus of claim 1 wherein the plurality of rollers disposed on the top wall rotate freely.

3. The apparatus of claim 1 wherein the plurality of rollers are smooth.

4. The apparatus of claim 1 wherein the plurality of rollers are notched.

5. The apparatus of claim 1 wherein the means for cutting comprises guillotine shears.

6. The apparatus of claim 1 wherein the plurality of rollers disposed on the side walls and upon the bottom wall are motorized.

7. The apparatus of claim 6 wherein the plurality of rollers are smooth.

8. The apparatus of claim 6 wherein the plurality of rollers are notched.

9. The apparatus of claim 6 wherein the means for cutting comprises guillotine shears.

10. An apparatus for compacting and cutting voluminous objects of strong elasticity, the apparatus comprising:

(a) means for cutting having a linearly moving blade coacting with a stationary shearing blade;

(b) a rectangular tunnel having a substantially horizontally aligned top wall, a substantially horizontally aligned bottom wall, the bottom wall parallel to the top wall, and two substantially vertically aligned side walls, each of the two side walls extending between the top wall and the bottom wall, the tunnel further including an entrance and an extremity, the tunnel being wider at the entrance than at the extremity, the extremity of the tunnel in communication with the means for cutting;

(c) a first set of cylindrical rollers disposed on and parallel to said top wall and said bottom wall, each of said first set of rollers extending substantially from one side wall to the other side wall, a second set of cylindrical rollers disposed on and parallel to said side walls, each of second set of rollers extending substantially from said top wall to said bottom wall, said first set of cylindrical rollers and said second set of cylindrical rollers being alternatingly interposed with one another as said objects advance thru said tunnel to said means for cutting, at least one of said sets of rollers being motorized, and wherein the plurality of rollers direct material fed into the entrance of the tunnel towards the extremity thereof and wherein the material is compressed within the tunnel and then cut by the means for cutting.

11. The apparatus of claim 10 wherein the means for cutting comprises guillotine shears.

* * * * *